United States Patent [19]

Ford

[11] 4,130,784
[45] Dec. 19, 1978

[54] APPARATUS FOR COMPENSATING ORDINATE PHASE LAG IN A PLOTTING APPARATUS

[75] Inventor: Michael A. Ford, Buckinghamshire, Great Britain

[73] Assignee: Perkin-Elmer Limited, Bucks, Great Britain

[21] Appl. No.: 722,192

[22] Filed: Sep. 10, 1976

[30] Foreign Application Priority Data

Sep. 12, 1975 [GB] United Kingdom ............... 37509/75

[51] Int. Cl.² .............................................. H02P 1/58
[52] U.S. Cl. .................................... 318/102; 318/621; 318/632; 346/33 A
[58] Field of Search ....................... 318/621, 632, 102; 346/33 A

[56] References Cited

U.S. PATENT DOCUMENTS

| | | | |
|---|---|---|---|
| 3,063,043 | 11/1962 | Coates | 346/33 A |
| 3,976,378 | 8/1976 | Pratt | 346/33 A |
| 4,000,946 | 1/1977 | Way et al. | 346/33 A |
| 4,038,664 | 7/1977 | Muir | 346/33 A |

Primary Examiner—Robert K. Schaefer
Assistant Examiner—Eugene S. Indyk
Attorney, Agent, or Firm—Salvatore A. Giarratana; Francis L. Masselle; Edwin T. Grimes

[57] ABSTRACT

In a plotting apparatus such as a spectrophotometer having a modifying system which introduces a phase lag between the occurrence of a change in a dependent variable quantity and plotting thereof against an independent variable quantity, in one embodiment, a cam is used to provide a quantity representing the dependent phase lag and the output of the cam is coupled to the driving system for the plotter so as to introduce therein a phase shift to compensate for the phase lag. In another, electrical embodiment the same object is accomplished by digitizing the phase lag and using the digital value to offset the wavenumber stepper motor and the chart stepper motor in the spectrophotometer with respect to each other.

12 Claims, 4 Drawing Figures

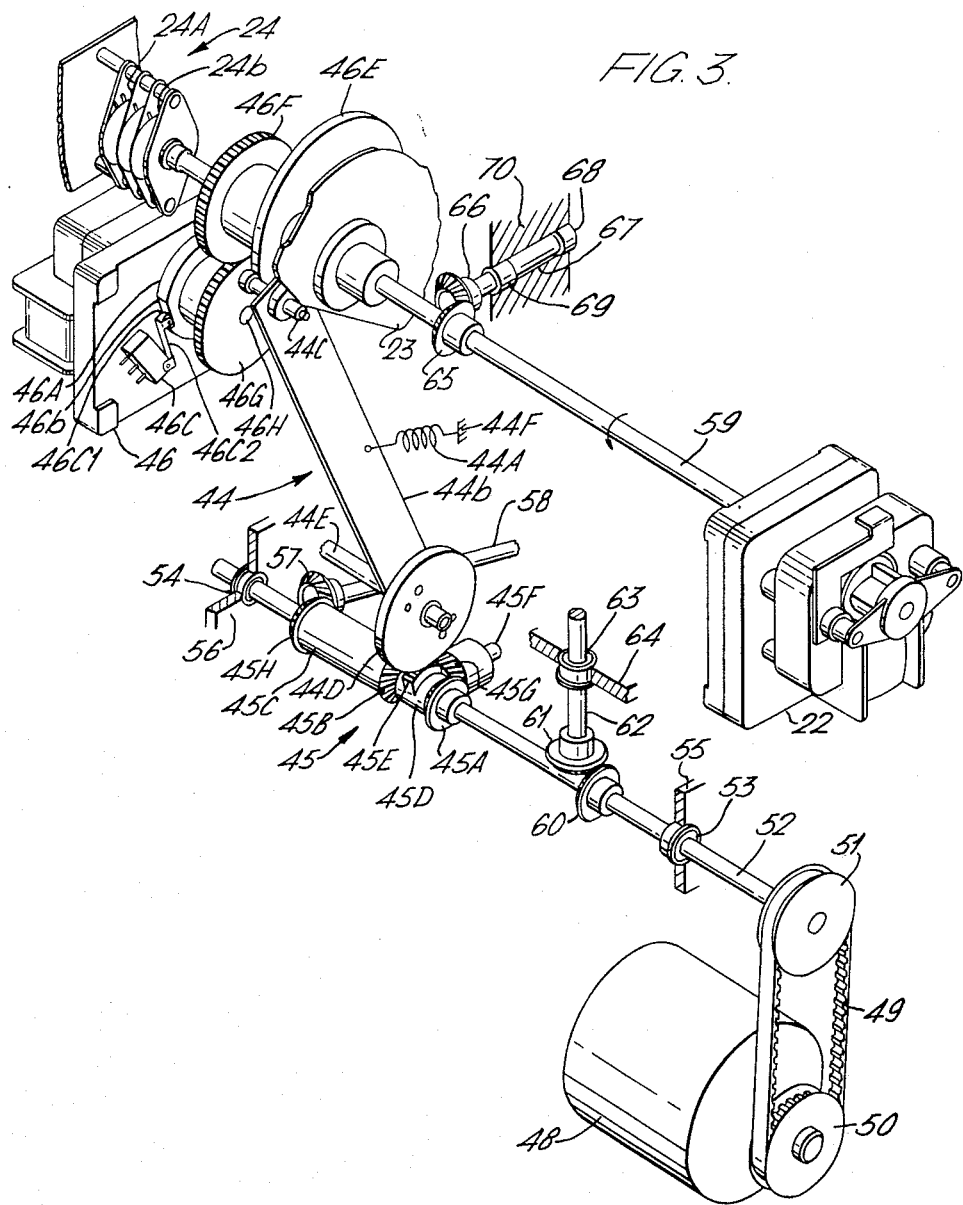

APPARATUS FOR COMPENSATING ORDINATE PHASE LAG IN A PLOTTING APPARATUS

BACKGROUND OF THE INVENTION

This invention relates to plotting apparatus in general and more particularly to an improved plotting apparatus wherein in operation, a modifying system introduces a significant time delay between the generation of a dependent variable quantity and the plotting thereof against an independent variable quantity.

The two quantities will hereinafter be referred to as the dependent variable and the independent variable, respectively.

The range of applications and usefulness of the present invention is best illustrated with specific reference to a spectrophotometer, both as regards the background discussion and the description of practical embodiments which follow.

In a spectrophotometric context, the dependent variable is identifiable with percentage sample transmission or absorption and the independent variable with wavenumber or wavelength scan. Reference to transmission and wavenumber will henceforth be assumed to include absorption and wavelength as possible respective alternatives.

Sample percentage transmission is generated in the form of a varying flux of suitable radiation handled by a modifying system that transduces the flux into correspondingly varying electrical signals, filters the signals to reduce their noise bandwith, routes them to the pen servo of a strip chart recorder and finally plots them as the ordinate against an absicssa slaved to the wavenumber scan.

The modifying system inevitably includes components with a finite, although substantially constant, electrical response. This, and the deliberate holding of electrical signals for the performance of specific functions within the system, such as digital computation, cause a time delay between the occurrence of a radiation flux change and the plotting of the corresponding electrical signal change that can be regarded as essentially fixed for any given instrument design and independent of any operational parameter selected.

The filter for limiting the noise bandwith is not, of course, one of the aforesaid components. Its response is strictly related to its time constant, which is one of the parameters that fundamentally affects the operation of a spectrophotometer and which, therefore, must be chosen with certain performance criteria in mind. This effectively means that the filter is bound to superimpose upon the fixed delay referred to a further delay which varies with the choice of its time constant. In other words: the total time delay introduced by the modifying system is variable.

While the modified sample transmission signal is being held up, the wavenumber scan is naturally proceeding at whatever rate the user has selected. By the time the electrical signal is recorded, the abscissa has moved ahead by a number of abscissa units, i.e., wavenumbers, which depends on the total signal delay encountered in the modifying system and the wavenumber scan rate is use. As a result, sample percentage transmission is plotted with a positional phase lag with respect to the wavenumber scan (assuming, of course, that corresponding instantaneous values of the two variable quantities are considered) and consequently fidelity of the plot must suffer.

More specifically, if the variable time delay and the fixed time dealy introudced by the modifying system are denoted as $f$ and $t$, respectively, $f+t$ is clearly the total time delay between the generation of sample percentage transmission as an optical signal and the corresponding electrical signal being recorded on the chart. Now, if $S$ is the scan rate in wavenumbers per second, $S(f+t)$ must naturally represent the wavenumbers scanned in time $T$, or in other words, the positional phase lead of the abscissa, which must, of course, be numerically equal to the positional phase lag of the plotted ordinate referred to the abscissa.

To appreciate the generality of the expression $S(f+t)$, it will be sufficient to generalize the meaning of $S$ as units of the independent variable passed per second.

It is assumed that the total time delay is substantially constant irrespective of the rate of change of the electrical signal or is made so by introducing suitable known means in the modifying system.

In the description that follows, the phrase "dependent phase lag" refers to the positional phase lag in plotting the dependent variable and the phrase "independent phase lead" refers to the positional phase lead in plotting the independent variable, both in terms of units of the independent variable. Furthermore, the phrase "phase tracking means" refers to the tracking of either the dependent phase lag or the independent phase lead, bearing in mind the equivalency therebetween as regards establishing the amount of dependent phase lag caused by the total time delay due to the modifying system.

It should be understood, moreover, that the term "plotting" refers to any suitable representation of the manner in which the dependent variable changes with respect to the independent variable and is in no way limited to the recording of a trace upon a chart. Computer printout or oscilloscope displays are examples of alternatives to be included within the meaning of the term.

SUMMARY OF THE INVENTION

The object of the present invention is to provide apparatus of the type defined above wherein means are included for enabling the effect of dependent phase lag to be substantially cancelled in the interest of plot fideltiy.

According to the present invention, there is provided in plotting apparatus of the type defined above, including a modifying system as referred to, phase tracking means and dependent phase lag compensating means responsive thereto for introducing any required compensating phase shift in the plot of the two variables that in operation will substantially cancel the effect of the dependent phase lag on plotting fidelity.

The above concept may be carried into effect by introducing the appropriate phase lead in the plotting of the dependent variable simply by introducing a phase lead in the generation of the dependent variable.

It may also be carried into effect by providing an appropriate phase lag in the plotting of the independent variable, such as by interposing such a lag between the generation of the independent variable and the plotting thereof.

The phase tracking means and the dependent phase lag compensating means may be adapted for cooperation either on a continuous or a stepwise basis, depending on whether the design of the plotting apparatus is such that the expression S(f+t) may vary continuously or in steps.

Apparatus for implementing the present invention for continuous operation may be embodied in a mechanical arrangement in which the phase tracking means comprise log and anti-log cams as well as an intermediate log adding device to produce a displacement representing a phase lead to be introduced in the generation of the dependent variable and the dependent phase lag compensating means comprise a suitable insertion device, e.g., a differential mechanism, for converting the displacement into the required phase lead.

The present invention may equally well be embodied in an electrical layout, such as one based on digital techniques which is particularly suitable where one master stepper motor is used to generate the independent variable, e.g., to provide the drive for the wavenumber scan in a spectrophotometer, and a slave stepper motor to produce the plot thereof, e.g., to drive a strip chart phased to the wavenumber scan in said spectrophotometer. The phase tracking means may be made to translate S(f+t) into the number of steps by which the slave stepper motor is leading, i.e., into the independent phase lead, and the dependent phase lag compensating means may be arranged to cause the start and stop of the slave stepper motor to be delayed relatively to the master stepper motor by that number of steps at the start and stop of the plotting operation.

A particularly convenient and simple way of providing for stepwise operation is to have an indexable multi-lobed rotary cam represent the phase tracking means, each lobe having a predetermined radius to produce, through a cam follower, a corresponding displacement which a differential device translates into a phase lead in the generation of the dependent variable. This solution has been found quite satisfactory in a spectrophotometer having what is known as "integrated mode" operation, meaning by this that the user may select only predetermined combinations of the three fundamental parameters: resolution, noise filter time constant and wavenumber scan rate.

BRIEF DESCRIPTION OF THE DRAWINGS

FIG. 3 is a perspective view detailing the cooperation of the phase tracking means and the dependent phase lag compensating means symbolized in FIG. 2.

DETAILED DESCRIPTION OF THE PREFERRED EMBODIMENT

Figure 1:
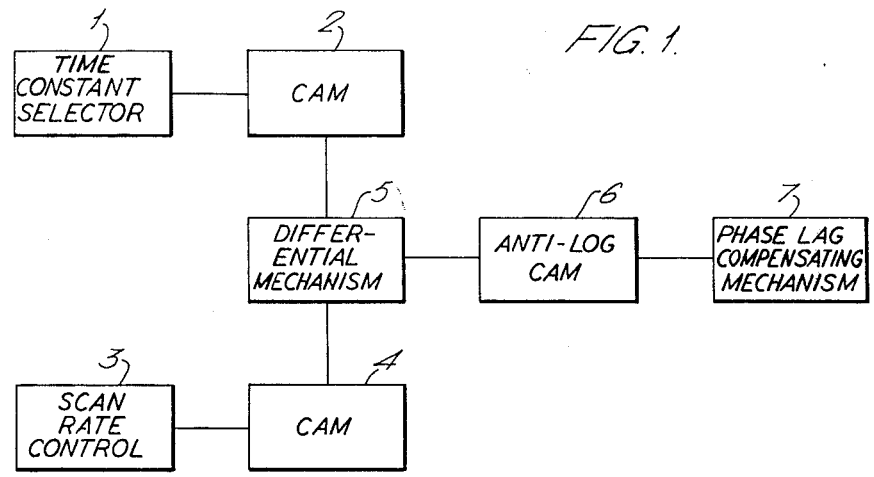
FIG. 1 is a block diagram of a mechanical arrangement for providing dependent phase lag compensation in a plotting apparatus, such as included in a spectrophotometer, in which the independent variable may be scanned at continuously variable rates.

The block diagram of FIG. 1 is assumed to relate to a plotting apparatus including a modifying system (not indicated), the response of which may be altered by the user through a control 1 which enables the time constant of a low pass filter in the system to be adjusted. Manipulation of control 1 rotates a cam 2, the contour of which cooperates with a cam follower to track the log of the sum of the variable time delay introduced by the system (said delay being identifiable with the filter time delay, which is proportional to the time constant selected by the user) and the fixed system delay. In terms of the notation referred to earlier, the displacement of said cam follower represents, therefore, the log of f+t. Similarly, manipulation of the scan rate control 3 for the independent variable rotates a cam 4 the contour of which cooperates with a cam follower in tracking the log of the scan rate. The two cam displacements are added together in a differential mechanism 5 to yield a displacement representing the log of the scan rate S multiplied by f+t. The output of the differential mechanism 5 drives the anti-log cam 6, the cam follower of which is displaced proportionally to S(f+t) and therefore tracks the independent phase lead.

A dependent phase lag compensating mechanism 7 introduces a phase lead in the generation of the dependent variable proportional to the displacement of the anti-log cam follower. The lead offsets the independent phase lead and consequently substantially cancels the effect of dependent phase lag on plotting fidelity. The manner in which it is introduced and the construction of mechanism 7 will be detailed below with reference to FIG. 3.

The schematic arrangement shown in FIG. 2 relates to a plotting apparatus forming part of spectrophotometer wherein only predetermined combinations (hereinafter called modes) of resolution, noise filter time constant and wavenumber scan rate may be selected by the user in what has already been referred to as the integrated mode of operation. The spectrophotometric parameters that concern the present embodiment of the invention are the time constant of the noise limiting low pass filter and the wave-number scan rate, since only these two parameters enter into the computation of S(f+f). The remaining parameter, resolution, has no specific role to play, but the selection thereof is accounted for in FIG. 2 for completeness in outlining the essentials of integrated mode operation.

Figure 2:
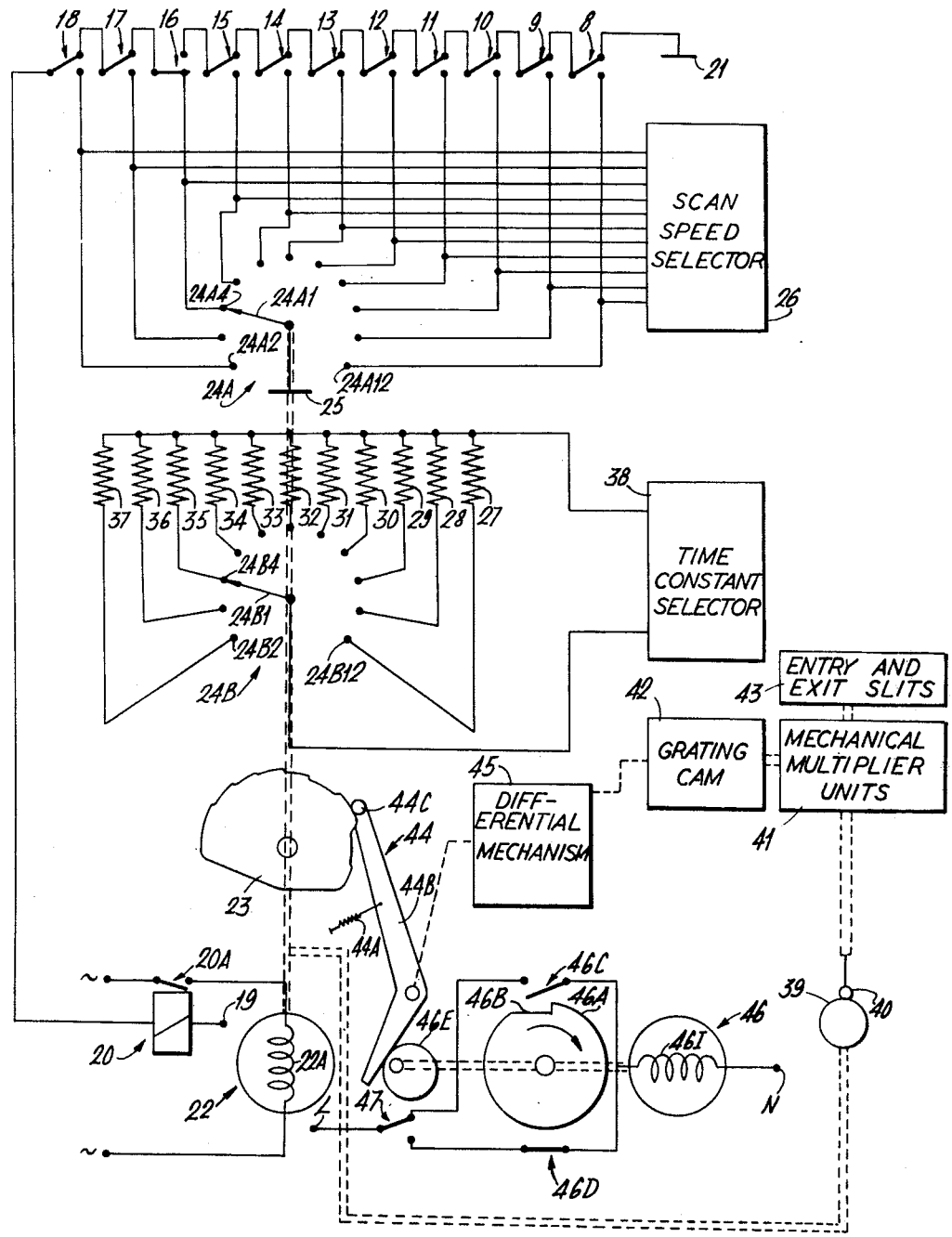
FIG. 2 is a schematic diagram of an essentially mechanical arrangement for providing compensation in a plotting apparatus forming part of a spectrophotometer in which the independent variable may be scanned only at certain predetermined scan rates.

In FIG. 2, two-way push-button switches 8 through 18 constitute the integrated mode control, enabling the user to select any one of eleven modes. When none of the switches is depressed, a series connection is established from positive DC supply point 19, through the winding of relay 20, through the upper contacts of said switches to negative ground 21, which connection causes the armature of relay 20 to be attracted and the relay contacts 20A to open. When any one of the switches 8 through 18 is depressed, the supply to relay 20 is interrupted, the contacts 20A are closed and an AC supply is extended through contacts 20A to the winding 22A of a shaded pole motor 22 integral in rotation with an eleven lobe cam 23, representing the phase tracking means, and ganged wafer switches 24A and 24B.

The switch 24A has a wiper 24A1 which as the motor 22 rotates sweeps over and against one or more of fixed contacts 24A2 to 24A12 until it meets the particular contact which through the switch which is depressed establishes a connection to ground 25 from the positive supply point 19 through the relay 20 whereupon the contacts 20A open and the motor 22 stops.

In FIG. 2, the switch 16 is shown in the depressed state and the wiper 24A1 has therefore been represented in alignment with fixed contact 24A4 connected to the lower contact of switch 16. Since for any mode selected there can only be one of contacts 24A2 to 24A12 which is connected to ground 25 through the wiper 24A1, there are eleven input combinations available for controlling the scan speed selector 26, in which one input is in logic state 0 and the remainder in a logic state of 1. With a logic 0 input established through the contact 24A4, the wavenumber scan rate associated with the mode activated by switch 16 is now selected.

Switch 24B, identical with switch 24A and having a wiper 24B1 in angular alignment with wiper 24A1, similarly provides selection of the filter time constant. To this end, resistors 27 to 37, for selecting the time constant, have one end connected in common to a line extending to filter time constant selector 38 and the other connected to one of contacts 24B2 to 24B12. The wiper 24B1 forms another connection to selector 38. In FIG. 2, resistor 35 has been selected and its value is designed to set a filter time constant which is appropriate for the mode selected by depressing switch 16.

Ganged with wipers 24A1 and 24B1, as well as cam 23, is an integrated mode slit-control cam 39 having as many lobes as the cam 23, i.e., 11. Each lobe cooperates with a cam follower 40 to route a mechanical displacement, representing the slit opening selected through the depression of the corresponding integrated mode switch, to the mechanical multiplier unit 41, to which there is also routed a mechanical displacement that is a function of the angular position of grating cam 42. Alternatively, if this function is first translated into log form by means of a log cam, a differential summing mechanism followed by an anti-log cam may be substituted for the multiplier 41. The output of the multiplier 41 controls resolution by adjusting the entry and exit slits 43 forming part of the spectrophotometer monochromator.

The function of the angular travel of grating cam 42 referred to hereinabove is designed to program the monochromator slits for constant energy at the detector of the spectrophotometer. The function generated by the cam 39 and follower 40 merely supplies a factor by which the first function is multiplied to superimpose an integrated mode resolution setting on the instantaneous setting given by the constant energy program.

Now, the dependent phase lag associated with each mode must be fixed because the parameters determining it are fixed. The radius of each of the eleven lobes of the cam 23 is proportioned in manufacture to represent the predetermined dependent phase lag associated with the corresponding mode. Consequently, the displacement of the cam follower 44 tracks the dependent phase lag from mode to mode in a stepwise fashion. This displacement is converted into a lead angle of the grating cam 42 through a differential mechanism 45, which represents the dependent phase lag compensating means and which will be described in greater detail later, with reference to FIG. 3.

It will be appreciated that no compensating lead angle is required when the spectrophotometer is used in a "time drive" mode to observe sample percentage transmission with respect to time at a chosen wavelength. Since wavelength is not scanned, no dependent phase lag can arise. Provision must, therefore, be made for cam follower 44 to be displaced to a position corresponding to zero compensation before the time drive is enabled. In FIG. 2, this is achieved by means of a shaded pole motor 46 provided with a disc 46A having a step 46B cut into its periphery for cooperation with the respective followers (not shown) of microswitches 46C and 46D, positioned 180° apart. The line L of an AC supply is extended to one end of the field winding 46I of motor 46 via a change-over switch 47 and whichever of microswitches 46C and 46D is made, the neutral N being permanently connected to the other end of field winding 46I.

When the switch 47 is in the position shown in FIG. 2 corresponding to "scan on", the follower of the microswitch 46C is accommodated in the step 46B and microswitch 46C is "off". Microswitch 46D, on the other hand, is "on" because its follower abuts against the unbroken periphery of the disc 46A. The disc 46A remains in the active position shown, corresponding to "scan on" until the switch 47 is changed over to the "scan off" position when the line L of the AC supply is extended to the motor 46 through the microswitch 46D. After the motor 46D has turned clockwise by 180°, switch 46D is broken and the motor stops at the rest position of the disc 46A, corresponding to "scan off". The motor 46 turns another 180° when the scan is switched on again, to stop once more at the active position of disc 46A.

Motor 46 drives an eccentric 46E, the rise of which acts on the prolongation of the follower arm 44B to lift the follower pin 44C of the cam 23 and urge the follower 44 against the pull exerted thereon by the spring 44A, to a datum angular position corresponding to zero dependent phase lag compensation, when the disc 46A is at its rest position following a scan stop.

When the disc 46A turns to its active position following the resumption of scan, the fall of the eccentric 46E faces the prolongation of the arm 44B and the spring 44A urges the follower pin 44C into contact with whichever lobe of the cam 23 has been selected through the operation of one of the switches 8 to 18. (Note that this arrangement is merely intended to convey in convenient diagrammatic form the mechanical function involved, without regard to constructional correspondence with the practical equivalent arrangement shown in FIG. 3.)

FIG. 3 depicts in particular the cooperation between the phase tracking means and the dependent phase lag compensating means represented in FIG. 2 by cam 23 (and follower 44) and unit 45, respectively.

In FIG. 3, a stepper motor 48, supplying the motive power for the entire spectrophotometer insofar as major functions are concerned, is coupled through a toothed belt 49, cooperating with toothed pulleys 50 and 51, to a main shaft 52 rotatable in bearings 53 and 54 supported in frame members 55 and 56 respectively.

Differential mechanism 45 comprises a bevel gear 45A pinned to main shaft 52, and spaced therefrom, a symmetrically disposed bevel gear 45B cut at one end of a cylindrical sleeve 45C rotatable with endwise location on main shaft 52. A generally cylindrical assembly 45D is located in the space between the gears 45A and 45B and is free to rotate on shaft 52. It comprises an upstanding section gear portion 45E and a radial stub 45F, the latter mounting a rotatable end-located bevel gear 45G meshing with both gears 45A and 45B, the three meshing gears being identical. The cylindrical sleeve 45C is formed at its other end into a bevel gear 45H engaging bevel gear 57 pinned to shaft 58, which drives the grating cam (not shown). The sector gear portion 45E meshes with sector gear 44D mounted for rotation with shaft 44E at one end of the follower arm 44B.

Shaded pole motor 22 drives a shaft 59 in a counterclockwise direction, the shaft 59 having pinned thereto the cam 23, against the contour of which the follower pin 44C is urged by the spring 44A secured to frame part 44F. An integrally machined assembly freely rotatable on shaft 59, behind cam 23, comprises eccentric 46E and gear 46F. The latter meshes with an identical gear 46G forming part of another integrally machined assembly, further including disc 46A provided with step 46B, the assembly being keyed to the motor shaft 46H.

Microswitch 46C is mounted on a frame part of motor 46 so that the follower 46C1 at the end of the follower arm 46C2 is resiliently urged towards the disc 46A. Microswitch 46D is similarly mounted at a diametrically opposite position and, therefore, cannot be seen in FIG. 3. The representations of motor 46 and disc 46A in FIG. 2 and FIG. 3, respectively, are consistent if one imagines that in FIG. 2 disc 46A is seen from the rear whereas in FIG. 3, it is seen from the front.

Shaft 59 is also made to drive a rotary switch 24 comprising switch wafers 24A and 24B.

Pin 44C acts as a follower of cam 23, and through a rearward extension, as follower of eccentric 46E. The instant "frozen" in FIG. 3 is the same as in FIG. 2, i.e., at scan start, except that cam 23 is in a different position. The follower 46C1 of microswitch 46C is therefore located in the step 46B and the pin 44C bears against cam 23 under the pull exerted by spring 44A, the restraint applied by the eccentric 46E having been removed.

Bearing in mind what has already been said about cam 23 in the description relating to FIG. 2, it is now clear that for any angular position of the follower arm 44 around the longitudinal axis of shaft 44E, as determined by the lobe of cam 23 that is engaged by the follower pin 44C, the sector gear 44D communicates a corresponding angular displacement to the sector gear portion 45E, which angular displacement through the action of bevel gear 45G meshing with bevel 45A (which is keyed, as stated above to shaft 52) and bevel gear 45B (which as was described is free to rotate on shaft 52), causes bevel gear 45B and, consequently, shaft 58 to acquire a lead angle over shaft 52 which cancels the effect, on the recorded plot, of the dependent phase lag associated with the mode selected.

In FIG. 3, the plot is assumed to be recorded on a strip chart (not shown) by a servo-positioned recording pen (not shown). The motion for the strip chart is derived from shaft 52 through bevel gear 60 pinned to shaft 52.

Bevel gear 60 meshes with a similar gear 61 pinned to shaft 62 rotatable in bearing 63 supported in frame part 64 (another bearing and support thereof must be imagined at the other end of shaft 62 shown broken in FIG. 3). Shaft 62 communicates with a sprocketed shaft (not shown) for transporting a strip chart provided with engaging perforations along its two longitudinal sides.

The shaft 59 has pinned thereto a bevel gear 65 cooperating with an identical bevel gear 66 pinned to shaft 67 rotatable in sleeve bearings 68 and 69 supported in frame part 70. The shaft 67 represents, in practical form, the command drive between the cam 23 and the cam 39 shown symbolically in FIG. 2.

Referring back to FIG. 2, it can now be readily seen that the manner in which the outputs of units 26 and 38, respectively, are utilized forms no part of the present invention and need not be described.

In describing the FIG. 1 embodiment, it was stated that the construction and operation of mechanism 7 would be detailed with reference to FIG. 3. That mechanism is in fact represented by the differential mechanism 45, the construction and operation of which has been amply covered in the foregoing description of FIG. 3. It is easy to imagine the follower of the anti-log cam 6 shown in FIG. 1 taking the place of the follower arm 44B in FIG. 3.

Figure 4:
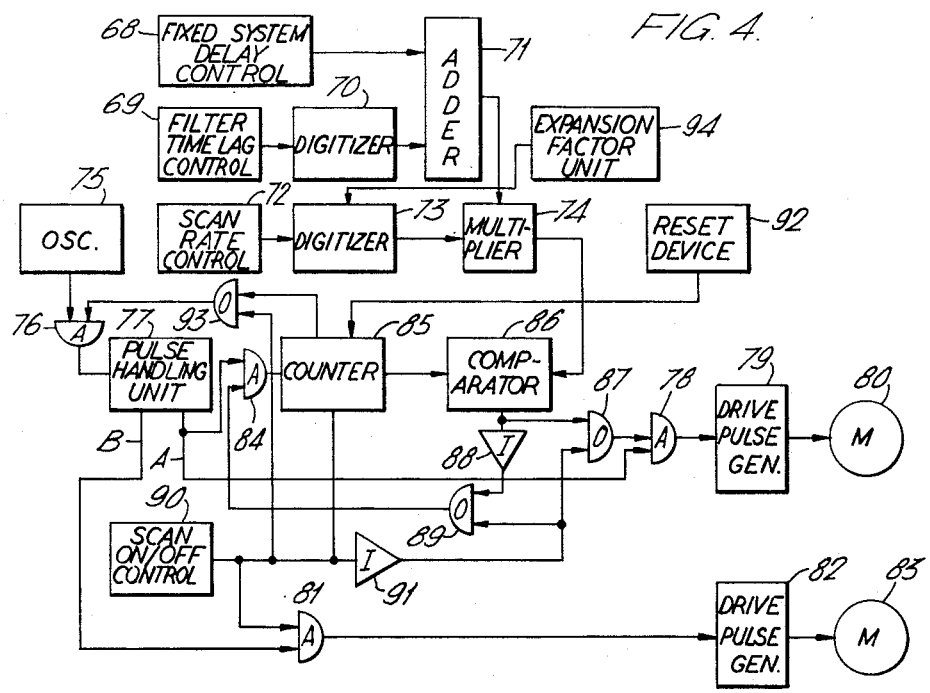
FIG. 4 is a block-logic diagram of an electrical layout for providing compensation in a plotting apparatus forming part of a spectrophotometer in which the independent variable may be scanned at continuously variable rates.

FIG. 4 is a block-logic diagram of an electrical implementation of the present invention. The arrangement of FIG. 4 is intended to enable dependent phase lag compensation to be applied for any selection of the three major spectrophotometer parameters. It is essentially capable of computing on a continuous basis the aforementioned general expression S(f + t) giving the wavenumber units ($\Delta \nu$) scanned during the total time delay caused by the modifying system, which is the independent phase lead, of course.

It does so by representing the abscissa lead over the ordinate as so many steps — conveniently referred to as Delta-nu steps of the chart stepper motor. Having done so, it provides the logic for ensuring that at scan start, the wavenumber stepper motor is advanced by the Delta-nu steps with respect to the chart stepper motor and at scan stop, the chart stepper motor is adanced by the same Delta-nu steps with respect to the wavenumber stepper motor. In other words, at scan start, the chart stepper motor is held stationary and the wavenumber stepper motor is advanced by the Delta-nu steps, after which both motors drive; and at scan stop, the wavenumber stepper motor is stopped and the chart stepper motor is advanced by the Delta-nu steps, after which both motors stop. In this manner, the abscissa lead is effectively cancelled, which is tantamount to saying that the effect of dependent phase lag on plot fidelity is substantially cancelled.

The fixed system delay t is set in digital form in device 68. The filter time lag f, assumed to be available in analogue form through unit 69 (which may represent, for example, the rotational angle of a shaft as set either by the operator or through a servosystem enabling the third major parameter to be automatically determined once the other two major parameters are chosen by the operator) is digitized in digitizer 70. The digital outputs of units 68 and 69 are added together in adder 71, the output of which thus represents the first part of the computation, i.e., f + t.

The scan rate S, assumed to be available in analogue form through unit 72 (the parenthetical observation expressed in regard to unit 69 applies to unit 72 as well) is digitized in digitizer 73. The digital output of digitizer 73 and that of the adder 71 are multiplied in multiplier 74, the output of which represents the completion of the computation in terms of the number of steps by which the chart motor leads the ordinate. The cooperating parts so far described represent the phase tracking means.

Digitizers 70 and 73 would naturally be dispensed with if S and f were available in digital form from units 69 and 72 respectively.

In the scheme represented in FIG. 4 for suppressing the Delta-nu steps, i.e., cancelling the abscissa lead and therefore applying dependent phase lag compensation, an oscillator 75 supplies timing pulses through AND gate 76 to the pulse handling unit 77 from which timing pulses in a selected frequency ratio are available in channels A and B. The A channel extends through the AND gate 78 to the drive pulse generator 79 supplying the chart stepper motor 80. The B channel extends through the AND gate 81 to the drive pulse generator 82 supplying the wavenumber stepper motor 83. Clearly motors 80 and 83 are de-energized if the controlling inputs of AND gates 78 and 81, respectively, are in state 0.

The A output channel of unit 77 is in addition extended through AND gate 84 to a counter 85, the output of which is compared with the output of multiplier 74 in comparator 86. The output of comparator 86, which is in state 0 when its two inputs are not equal, is passed through OR gate 87 to form the controlling input of AND gate 78. It is also passed through inverter 88 and OR gate 89 to form the controlling input of AND gate 84.

A SCAN ON/OFF control 90 has an output logic state of 1 when the "ON" function is selected and this state commands the counter 85 to count up. Conversely, logic 0 will correspond to the "OFF" and "COUNT DOWN" functions being selected. The output state of control 90 is inverted by inverter 91 before forming an input of both OR gates 87 and 89.

Counter 85 is assumed to be reset to zero by a reset device 92 when the spectrophotometer is first switched on. The reset device 92 may be part of a re-setting arrangement which comes into operation by first reversing the wavenumber drive past the scan origin and then lining up scan origin and chart origin before an actual scan may commence in forward drive with counter 85 reset to zero.

Assume that the lining up process has been completed and that the "ON" function has been selected in control 90. The logic 1 output of control 90 will enable the AND gate 81 and by placing a logic 1 input on OR gate 93, whose other input is zero when counter 85 reads zero, will enable AND gate 76 so that the wavenumber stepper motor 83 is set in motion. It will also command the counter 85 to count up and through the inverter 91, it will cause a logic 0 input to be present at OR gates 87 and 89.

Now, the input to comparator 86 derived from multiplier 74 cannot at first be equal to that derived from counter 85, with the result that initially comparator 86 will have a logic 0 output which makes the other input and consequently the output of OR gate 87 also 0, this keeping the AND gate 78 disabled and the chart stepper motor 80 stationary. The 0 output state of comparator 86, inverted by inverter 88 gives the OR gate 89 an output state of 1 which enables the AND gate 84. With the wavenumber stepper motor 83 running and the chart stepper motor 80 stationary a count accumulates in counter 85 until the output state of the comparator 86 changes from 0 to 1 upon the equalization of its two inputs. When that happens, AND gate 84 is disabled, but the count in counter 85, now equal to the output of multiplier 74, remains stored therein. In addition, the output state of OR gate 87, and consequently, the state of the controlling input of AND gate 78, changes to 1 so that the chart motor 80 begins to drive.

When the "STOP" function is selected in control unit 90, the 0 output state resulting commands the counter 85 to count down; causes the AND gate 81 to be disabled, thus stopping the wavenumber stepper motor 83; places a logic 1 input through the inversion of the 0 state at inverter 91, on OR gate 87, thus keeping AND gate 78 enabled and the chart stepper motor 80 running; changes to 0 the input to OR gate 93 set to 1 when the "ON" scan function was selected (note that the other input of OR gate 93 is still at 1, and therefore, AND gate 76 is still enabled, because there is a count other than zero in counter 85); and, finally, places a logic 1 input on OR gate 80 and consequently, keeps AND gate 84 enabled. When the counter 85 resets to zero, both inputs of OR gate 93 are in a logic state 0 and the AND gate 76 is disabled. Thus, the stop function initiated through control unit 90 is finally made effective for both stepper motors.

The system so far described assumes that the timing pulses on channels A and B of unit 77 are in the frequency ratio of 1:1. Unit 77 is in fact designed to provide other frequency ratios to enable for example a comprehensive range of abscissa scale expansions to be included. When an abscissa scale other than ×1 (× stands for times) is required, the proper scale expansion factor is chosen through the expansion factor unit 94 which multiplies the output of the digitizer (or on the unit 72 if such unit provides a digital output) by that factor.

The general concept of the present invention, but with particular regard to the embodiments described with reference to FIGS. 1 to 4, is particularly useful in conjunction with the abscissa scale change systems detailed in applicant's copending U.S. patent application Ser. No. 716,301, filed Aug. 20, 1976, now U.S. Pat. No. 4,073,198, issued on February 14, 1978, and entitled "Apparatus for Changing the Speed Ratio Between First and Second Displaceable Members", the specification of which is being hereby incorporated by reference into the present application. Since the dependent phase lag is affected by scan rate, it would clearly be a tiresome task to reset the abscissa to compensate for said lag every time the scale abscissa was changed.

The invention is also useful, however, where no scale change system is employed. Referring once more to the case of a spectrophotometer, the abscissa would not read correctly unless the chart was accurately set against the wavenumber dial reading (assuming such reading could be relied upon) or against the peak of an accurately known band in the spectrum of a test sample.

The crucial point that need be emphasized is that the abscissa must be set when the instrument is not scanning and there is no means of telling whether the setting is correct until it has been verified through an actual run that a test peak appears at the correct abscissa value. Several runs may be required before satisfactory accuracy is achieved by trial and error. This is inconvenient enough where only one or two abscissa scales are provided. It becomes a serious disadvantage in the case of multi-scale instruments. The present invention thus avoids this problem by insuring that proper compensation is provided at all different operating scales.

What is claimed is:

1. In an apparatus for plotting a dependent variable quantity against an independent variable quantity comprising separate means for generating the two variables, the means for generating the dependent variable including a modifying system at least one parameter of which introduces in operation a significant variable time delay between the occurrence of an instantaneous value of the dependent variable and the plotting thereof against the independent variable leading to a variable dependent phase-lag in the plotting of the two variables as the means for generating the independent variable scans through successive values thereof, THE COMBINATION with one of the two means for generating the variables of phase tracking means for producing an output quantity representing any such phase-lag and dependent phase-lag compensating means in operational relationship with the phase tracking means to introduce a phase shift in response to said output in said one of two means, whereby in operation, the effect of dependent phase-lag on plotting fidelity is substantially cancelled.

2. Apparatus as claimed in claim 1, wherein the output quantity produced by the phase tracking means represents total time delay, including any fixed system delay, between the generation and plotting of the dependent variable times the scan rate of the means for generating the independent variable in terms of the units of the independent variable scanned per second.

3. Apparatus as claimed in claim 2, wherein said dependent phase-lag compensating means introduce a compensating phase lead in the means for generating the dependent variable.

4. Apparatus as claimed in claim 2, wherein said dependent phase-lag compensating means introduce a compensating phase lag in the means for generating the independent variable.

5. Apparatus as claimed in claim 2, having continuous setting means for adjusting the said parameter to any value within a predetermined range, wherein the phase tracking means and the dependent phase-lag compensating means are operationally related to said continuous setting means to apply a compensating phase shift that is correct for any chosen setting of said continuous setting means.

6. Apparatus as claimed in claim 2, having discontinuous setting means for adjusting the said parameter to any of a predetermined range of pre-fixed values, wherein the phase tracking means and the dependent phase-lag compensating means are operationally related to said discontinuous setting means to apply a compensating phase shift that is correct for any chosen setting of said discontinuous setting means.

7. Apparatus as claimed in claim 2, having a first setting means for adjusting the value of said parameter within a predetermined range of values and a second setting means for adjusting the scan rate of the means for generating the independent variable within a predetermined scan range, wherein the phase tracking means comprise:
  (a) first conversion means coupled to said first setting means to produce a mechanical displacement representing the log of the sum of the variable time delay and any fixed time delay;
  (b) second conversion means coupled to said second setting means to produce a mechanical displacement representing the log of the scan rate;
  (c) log adding means coupled to both said first and said second conversion means to produce a displacement representing the sum of the two log displacements; and
  (d) anti-log means coupled to said log adding means for producing a displacement representing the anti-log of said sum of the two log displacements, and wherein the dependent phase-lag compensating means is coupled to receive the anti-log displacement and coupled to the means for generating the dependent variable to introduce therein a phase lead in the generation of the dependent variable that is proportional to said anti-log displacement.

8. Apparatus as claimed in claim 2, having means for generating the variables which include a first stepper motor and a second stepper motor, means for interrelating the speeds of the two motors, one of which controls the scan rate, a first setting means for adjusting the value of said parameter and a second setting means for selecting the speed of the stepper motor controlling the scan rate, wherein the phase tracking means comprise computational means operatively connected with the first and the second setting means for computing the sum of the variable time delay and any fixed time delay times the number of independent variable units scanned per second and evaluating in terms of stepper motor pulses the number of said units scanned in the total time delay and wherein the dependent phase-lag compensating means comprise means coupled to said computational means to delay the start and stop of one stepper motor relatively to the other by said stepper motor pulses.

9. Apparatus as claimed in claim 2, having an integrated mode of parameter selection which enables only predetermined combinations of at least said parameter and of the scan rate to be selected by the user upon the operation of integrated mode setting means, wherein the phase tracking means comprise:
  (a) means for storing a range of selectable output quantities each representing the dependent phase-lag predeterminedly computed for one of said predetermined combinations; and
  (b) means responsive to the integrated mode setting means for selecting the output quantity associated with the predetermined combination actually selected through the setting means.

10. Apparatus as claimed in claim 8, wherein said apparatus is a chart recording spectrophotometer, one stepper motor provides the wavelength scan drive and the other stepper motor the chart drive.

11. Apparatus as claimed in claim 8, wherein said apparatus is a spectrophotometer, the parameter is noise filter time constant and the scan rate is the wavelength scan rate of the spectrophotometer.

12. Apparatus as claimed in claim 2, wherein said apparatus is a recording spectrophotometer, the parameter is noise filter time constant, the modifying system is an electrical signal handling system including said noise filter and the scan rate is the wavelength scan rate of a spectrophotometer.

* * * * *